United States Patent [19]
Tyson

[11] 3,893,737
[45] July 8, 1975

[54] THRUST BEARING HAVING LUBRICATION SYSTEM

[75] Inventor: Leonard L. Tyson, Houston, Tex.
[73] Assignee: Marchem Resources, Inc., Houston, Tex.
[22] Filed: Apr. 19, 1974
[21] Appl. No.: 462,243

[52] U.S. Cl. .................................. 308/160; 308/168
[51] Int. Cl. ........................ F16c 17/06; F16c 17/08
[58] Field of Search ............ 308/160, 168, 169, 170

[56] References Cited
UNITED STATES PATENTS

| | | | |
|---|---|---|---|
| 1,905,443 | 4/1933 | Cope et al. | 308/168 |
| 2,069,367 | 2/1937 | Hollander | 308/168 |
| 2,179,875 | 11/1939 | Baker et al. | 308/168 |
| 2,507,021 | 5/1950 | Lakey | 308/160 |
| 2,553,107 | 5/1951 | Needs | 308/168 |
| 2,558,262 | 6/1951 | Maxwell et al. | 308/160 |
| 3,434,766 | 3/1969 | Kampert et al. | 308/160 |

*Primary Examiner*—Lloyd L. King
*Attorney, Agent, or Firm*—James L. Jackson

[57] ABSTRACT

A self-leveling thrust bearing, according to the present invention, may include a generally circular retainer element that retains a plurality of segmental thrust pads in substantially normal and stationary relationship relative to a rotatable shaft that may be horizontally mounted. A thrust runner or collar, that is non-rotatably secured to the shaft and extends in substantially normal relation with the shaft, may be provided with a generally planar annular thrust force applying face that may be disposed in engagement with bearing surfaces formed on the plurality of thrust pad segments. Leveling links may be interposed between the retainer and thrust pad segments in order to maintain the bearing face of each of the segments in intimate equal load distributing engagement with the bearing face formed on the thrust runner or collar. A thin hydrodynamic film of lubricating oil may be maintained between the bearing face and the thrust faces of the thrust pad segments by a bearing lubrication system. The lubrication system may incorporate a plurality of lubricating oil jet heads that also serve as retainer elements for the thrust pad segments and the leveling links. The jet heads direct jets of lubricating oil against the bearing face of the thrust runner or collar to maintain the film of lubricating oil. The jets of oil are of particular directional nature, at least some of the jets of oil having a radially inward component of direction that opposes the direction imparted to the film of oil by the centrifugal force of the rotating thrust runner or collar, depending upon the speed of shaft rotation and upon particular size of the bearing being lubricated. Others of the jets have a radially outward component of direction, while still other jets of lubricating oil may be directed in normal relation against the thrust applying face.

20 Claims, 8 Drawing Figures

THRUST BEARING HAVING LUBRICATION SYSTEM

FIELD OF THE INVENTION

The present invention is related generally to self-leveling sliding bearings and more particularly to self-leveling thrust bearings that support thrust loading of rotating shafts, whether the rotatable shaft is horizontally, vertically or otherwise disposed. More specifically, the invention is related to incorporation of a novel lubrication system for self-leveling type thrust bearing structures, wherein the lubrication system compensates for the effects of centrifugal force on the film of lubricating oil and effectively maintains an even distribution of lubricating oil between all parts of the bearing surfaces.

BACKGROUND OF THE INVENTION

Ordinary self-levleing sliding thrust bearings have long been utilized for supporting thrust loads applied to horizontally or vertically disposed rotatable shafts. Where thrust loads are substantial and the rotatable shaft applying the thrust loading is vertically disposed, means is typically provided defining single or multiple planar bearing surfaces that support thrust loading applied by a generally horizontally disposed "thrust runner" that has a thrust load applying surface of generally planar configuration and is non-rotatably secured to the rotatable shaft. A flood type lubrication system is typically employed to maintain a thin hydrodynamic film of lubricant between the bearing and thrust applying surfaces of the runner and the thrust support surfaces of the thrust pads or shoes of the bearing structure.

When the shaft imparting thrust loading to the bearing structure is horizontally or generally horizontally disposed, the thrust bearing structure will have a similar configuration, typically differing in that a "thrust collar" is provided that is non-rotatably secured to the rotatable shaft and is of slightly different configuration as compared to the runner for vertical shafts. For the purpose of the present invention, however, the structural differences between thrust runners and thrust collars can be considered immaterial since the present invention finds effective utilization in both types of thrust bearing structures. Both the runner and collar, however, are provided with annular generally planar bearing faces or thrust applying surfaces that have rotatable bearing engagement with planar thrust load receiving surfaces of generally stationary thrust support pads. Accordingly, reference to thrust bearing structures herein shall include thrust bearings for both horizontally and vertically disposed rotatable shafts and rotatable shafts that are otherwise disposed.

Flood type bearing lubrication is employed for maintaining a hydrodynamic film of lubricating oil between the bearing faces and thrust support surfaces of the collars or runners of thrust bearings, there being provided a sump or casing that contains a quantity of lubricating oil maintained by a pressure lubrication system. The lower portion of the bearing structure and collar are typically immersed in the lubrication oil at commencement of rotation thereby causing the collar to transport or "pump" lubricating oil as it rotates relative to the stationary thrust support pads. As the intitial sump oil is pumped out past the thrust pads the sump is continually replenished by the external lubrication system with oil conventially directed past the back of the bearing retainer to the rotating shaft; along which is cuased to pass axially to the collar which, by boundary layer centrifugal pumping action, continues the flow over and between the thrust pads and rotating collar. Lubrication of this particular nature is typically employed to maintain the thin film of lubricant between the bearing face of the runner or collar and the thrust support faces of the thrust pads that is necessary to prevent development of excessive heat that cause rapid deterioration of the engaged bearing surfaces of the bearing structure.

When typical thrust bearings are provided with flood type lubrication, the rotary or collar of the bearing structure is partially immersed in the bath of oil at all times. The oil bath imparts a force to the rotating portion of the thrust bearing that retards rotation and places a load on the power source driving the rotating shaft to which the bearing structure is related. This load has been found in some cases to represent a 30% to 40% efficiency loss in the thrust bearing structures, thereby causing an efficiency loss that amounts to as much as 1% or better of the total efficiency of the power source. It is therefore desirable to eliminate as much as possible the efficiency loss that is typically induced into the bearing structure and power source by the force retarding effects of oil bath type bearing lubrication systems. This is particularly so since a significant portion of the efficiency loss is seen in an increase in oil temperature in the bearing housing which decreases the specified load capacity of each pad of the bearing structure.

Where the bearing structure for a rotatable shaft is of substantial dimension, for example, 48 inches in outside diameter, and/or when the speed of rotation of the shaft is quite high, the centrifugal force acting upon the film of lubricant between the bearing surfaces will be quite substantial. The centrifugal force acting on the lubricant film between the bearing faces may be sufficient to induce undesirable radially outward movement of the lubricant film, thereby causing the lubricant film to be insufficient to maintain the desired spaced relationship between the bearing faces of the thrust support pads and the collar or runner. When this occurs, excessive heat and wear is developed and the thrust bearing structure will deteriorate quite rapidly. This effect is conventionally controlled by providing some oil flow restricting device at bearing oil outlet. However, this device causes the work done on the oil by rotating collar to be seen as a temperature increase, with the consequent loss of load capacity as noted above.

Where self-leveling type thrust pads are employed, the centrifugal force induced by rotary movement and acting upon the lubricant film, may cause the orientation of the movable thrust support pads to be controlled somewhat by reaction of the lubricant film to be thinner than is desirable adjacent the inner peripheral portions of the thrust runner or collar and thicker at the outer peripheral portions thereof. This condition, also referred to as "oil starvation," may cause excessive wear at the inner peripheral portions of the opposed bearing surfaces and in addition may induce undesirable thrust loading of the bearing structure by causing the self-leveling thrust pads to assume unequal spacing at the inner and outer portions thereof responsive to the thickness of the film of lubricant. Oil starvation may cause uneven distribution of froces in the bearing structure and may induce excessive bearing wear in certain specific areas of the bearing structure.

It is desirable, therefore, to provide a unique thrust bearing structure that incorporates a lubrication system that promotes even distribution of lubricant material to the bearing faces of the structure and retards the effects of centriugal force action on the lubricant film even though the bearing structure may be of substantial dimension and/or the rotatable shaft may have sufficient speed of rotation that centrigual force would otherwise become a matter of major consideration from the standpoint of efficient lubrication.

Accordingly, it is a primary object of the present invention to provide a novel thrust bearing structure having a lubrication system which takes lubricating fluid from a bearing housing entry point and directs such fluid immediately upstream of the leading edge of each thrust pad segment such that there is a minimal temperature rise in the fluid until it becomes part of the thrust load bearing process by directing at least one jet lubricating oil to at least one of the bearing faces of the bearing structure, wherein the direction of flow of the jet lubricating oil has a component of direction opposing the direction induced by centrifugal force acting upon the lubricant film maintained between the bearing faces.

It is another object of the present invention to provide a novel thrust bearing structure having a lubrication system that directs jets of lubricating oil against at least one of the bearing faces of the thrust bearing structure, whereby a plurality of jets of lubricating oil are directed in evenly distributed manner across the radial width of the bearing face and wherein at least some of the jets of lubricating oil are directed against one of the bearing faces with a component of direction that opposes the direction of flow induced by bentrifugal force acting upon the film of lubricant between the bearing faces.

It is an even further object of the present invention to provide a novel thrust bearing structure of the self-leveling type, wherein a bearing lubrication system is employed having a plurality of lubricating heads disposed variously about the circular bearing structure and wherein each of the lubricating heads directs a plurality of jets of lubricating oil against at least one of the bearing faces, some of the jets of lubricating oil having a component of direction opposing the direction of flow induced by centrifugal force acting upon the lubricant film between the bearing faces and at least some of the jets of lubricating oil being directed in substantially normal relation to the bearing face to provide for even distribution of lubricating oil and to oppose the effects of centrifugal force acting upon the lubricant film between the bearing faces.

Among the several objects of the present invention is noted the contemplation of a novel thrust bearing structure of the self-leveling type, which employs a plurality of lubricating heads disposed variously about the generally circular structure of the thrust bearing, each of which lubricating heads directs a plurality of jets of lubricating oil against at least one of the bearing faces, at least some of the jets of lubricating oil having a component of direction that opposes the direction of flow induced by centrifugal force acting upon the lubricant film between the bearing faces, and at least some of the jets of lubricating oil having a component of direction that coincides with the direction of centrifugal force induced flow of the lubricant film.

It is another important object of the present invention to provide a novel thrust bearing structure of the self-leveling type, that incorporates a unique lubrication system incorporating a plurality of lubricant distribution head elements that retain the thrust pads and leveling links in assembly with other components of the bearing structure and also direct jets of lubricating oil against a rotating bearing face of the bearing structure, which jets of lubricating oil radiate in variously angulated manner from the lubricant distribution heads and at least some of the jets have a component of direction that opposes the direction of flow that is induced to a lubricant flim between the bearing surfaces by centrifugal force of a rotating portion of the bearing structure.

Another feature of the present invention incorporates the provision of a novel thrust bearing structure of the self-leveling type and which bearing structure incorporates a unique lubrication system having a plurality of lubricant distribution heads each having a plurality of jet orifices for distributing lubricating oil on the bearing face of a rotatable bearing element and which lubricant distribution head structure incorporates a lubricant filter that effectively prevents foreign matter that might be present in the lubricating oil from reaching the jet orifices if the foreign matter is of larger dimension than the jet orifices.

Other and further objects, advantages and features of the present invention will become apparent to one skilled in the art upon consideration of this disclosure including the specification and annexed drawings. The form of the invention, which will now be described in detail, illustrates the general principles of the invention, but it is to be understood that this detailed description is not to be taken as limiting the scope of the present invention.

SUMMARY OF THE INVENTION

A self-leveling thrust bearing, according to the present invention, may incorporate an efficient lubrication system, wherein jets of lubricating oil are directed from at least one and preferably a plurality of lubricant distribution heads and are caused to impinge upon at least one of a pair of bearing surfaces to provide a thin hydrodynamic film of lubricating oil between the bearing surfaces that prevents excessive bearing wear. The jets of lubricating oil may be variously oriented to cause even distribution of lubricating oil on the bearing surface involved and at least some of the jets of lubricating oil may have a component of direction that opposes the direction of flow that is induced on the film of lubricating oil between opposed bearing surfaces by centrifugal force that is caused upon rotation of one of the elements of the bearing structure. Additionally, other jets of lubricating oil may be directed from the respective lubricating heads and may have components of direction that are either normally disposed relative to the bearing face involved or have components of direction that coincide with the direction of lubricant film flow that is induced by centrifugal force. The directional jets of lubricating oil, in addition to causing even distribution of lubricating oil to the bearing surfaces, provide greater flow of lubricating oil in specific portions of the bearing structure that are likely to bestarved by the effects of centrifugal force acting upon the film of lubricant thereby causing the hydrodynamic lubricant film to be of even thickness between the various bearing faces of the bearing structure.

A self-leveling thrust bearing, according to the present invention may incorporate a generally rigid retainer structure for retention of a plurality of thrust pad segments, each thrust pad segment having a thrust support surface or bearing face that is disposed in opposed bearing engagement with a generally planar bearing face formed on a thrust runner or collar. The thrust runner or collar is non-rotatably secured to a rotatable shaft, thereby causing the thrust runner or collar to rotate relative to the thrust pad segments. A plurality of leveling links are retained between the retainer element and the thrust pad segments and function to cause the individual thrust pad segments to seek optimum bearing engagement with the bearing face of the thrust runner or collar.

Bolts or studs may be employed to retain the thrust pad segments in proper position relative to the retainer element and may also define lubricant distribution head portions of a bearing lubrication system that maintains a thin hydrodynamic film of lubricating oil between the bearing faces of the thrust pad segments and the thrust runner or collar. Each of the bolts or studs may have a lubricant passage formed therein and communicating with a plurality of directional jet passages that direct jets of lubricating oil against a bearing face of the bearing structure. The jet passages are directionally oriented in a head-like portion of the stud or bolt structure for the purpose of even distribution of lubricating oil on the bearing face. To overcome the tendency of the film of lubricating oil between the bearing faces to flow radially outwardly under the influence of centrifugal force induced by a rotating element of the bearing structure, at least some of the directionally oriented jets of lubricant have componets of direction that oppose the direction of centrifugal force induced flow of the lubricant film. Additionally, the directionally oriented jets of lubricating oil may include jets that are disposed in normal relation to the bearing surface involved and/or may have components of direction that are normal to or coincide with the direction of lubricant film flow under inducement by centrifugal force.

A thrust bearing mechanism, according to the present invention, may incorporate a bearing retainer element supporting a plurality of thrust pad segments, each of the segments being individually oriented relative to a rotatable runner or collar by a plurality of leveling links disposed between the thrust pad segments and the retainer. The thrust pads may have a thrust face formed thereon that may be disposed in opposed relationship with a bearing face formed on the runner or collar, the runner or collar being non-rotatably secured to a vertically or horizontally disposed shaft, as the case may be. Within the retainer portion of the bearing structure may be provided a lubricating passage that is communicated with a source of lubricating oil for the purpose of providing a thin hydrodynamic film of lubricating oil between the thrust face of the various thrust pads and the bearing face of the rotatable runner or collar. A plurality of directionally oriented jet passages terminating in jet orifices may be formed in the retainer element and may intersect the respective lubricant passage. The directional jets of lubricating oil, emerging from the orifices defined by the directionally oriented lubricant jet passages, will direct jets of lubricating oil, at least some of which having a component of direction that opposes the direction of flow induced to the film of lubricant between the thrust face and the bearing face by centrifugal force upon rotation of the runner or collar by the shaft.

The lubricant supply system of the present invention may be provided with a filter mechanism, that may conveniently take the form of a threaded or grooved rod-like element having alternating blind grooves defined therein. The threaded filter element will be received within a generally cylindrical bore defining a lubricant passage of the lubricating system and will cooperate with the cylindrical wall of the bore to cause lubricant to flow through small filter interstices defined by the thread spaces between the blind alternating grooves. The interstices or small filter passages are of smaller dimension than the dimension of the directionally oriented oil jet passages, thereby preventing any foreign matter contained in the lubricating oil from reaching and clogging the lubricant jet passages that could otherwise cause oil starvation between the juxtaposed thrust faces of the thrust pads and bearing face of the runner or collar.

DESCRIPTION OF THE DRAWINGS

So that the manner in which the above recited features, advantages and objects of the present invention, as well as others, which will become apparent, are attained and can be understood in detail, more particular description of the invention, briefly summarized above, may be had by reference to the embodiments thereof which arre illustrated in the appended drawings, which drawings form a part of this specification.

It is to be noted, however, that the appended drawings illustrate only typical embodiments of the invention and are, therefore not to be considered limiting of its scope, for the invention may admit to other effective embodiments.

In the drawings.

DESCRIPTION OF PREFERRED EMBODIMENT

Figure 1:
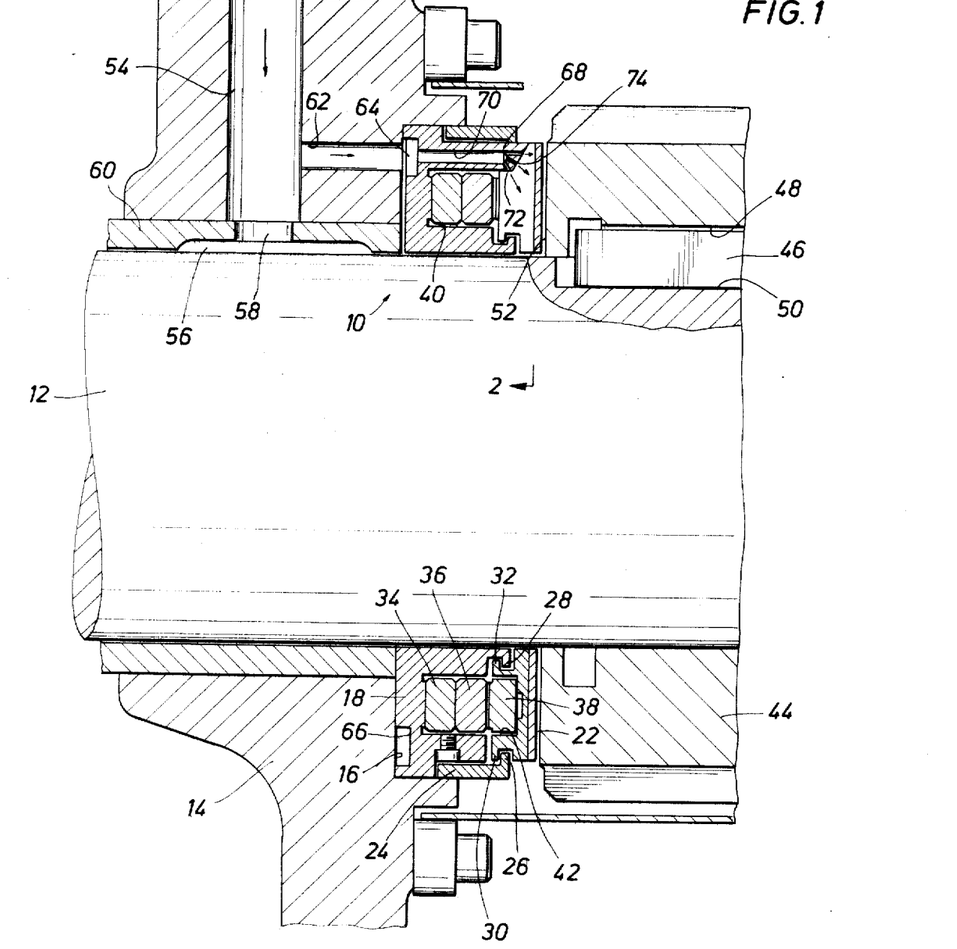
FIG. 1 is a sectional view of a thrust bearing structure for a horizontally disposed shaft, the thrust bearing structure being constructed in accordance with the present invention.

With reference now to FIG. 1 there is depicted a thrust bearing assembly, generally at 10, that may be of the self-leveling type and which incorporates a lubrication system that is constructed and functions in accordance with the present invention to enable the thrust bearing structure to carry thrust loads applied thereto by a rotatable shaft 12 and remains fully serviceable for extended periods of time. A bearing retainer housing 14 may be disposed about the rotatable shaft 12 and may have formed therein an annular bearing retainer groove or recess 16, within which may be received a bearing retainer ring body structure 18, which is typically an annular rigid ring structure.

It is typical for self-leveling type thrust bearings to be provided with thrust force receiving elements that are movable relative to a retainer ring and are allowed to "float" into thrust receiving engagement with a structural element applying thrust thereto. Accordingly, a plurality of thrust pad elements 20 may be recieved in movable relation with the generally rigid retainer ring structure 18 and each of the thrust segments may have defined thereon a thrust face 22 of wear resistant characteristics. A thrust pad retainer ring element 24, having an inwardly disposed flange 26 formed thereon, will cooperate with an annular flange 28 defined on the bearing retainer ring body 18 to receive opposed flanges 30 and 32 defined on each of the thrust segments 20 and serving to retain the thrust segments in movable but captured relation with the annular retaining ring body 18.

To establish a movable and yielding relationship of the thrust segments 20 as thrust loads are applied thereto and to support such thrust loads, a plurality of self-equalizing links 34, 36 and 38 may be received within a leveling link retainer chamber that is cooperatively defined by annular grooves or recesses 40 and 42 defined respectively in the retainer ring structure 18 and in the thrust pad elements 20. The leveling links 34, 36 and 38 are movable one relative to the other in such manner as to allow slight tilting or shifting of the thrust face of the thrust pad elements, thereby allowing the thrust face to automatically become precisely aligned relative to a rotor or runner that applies thrust loads to the thrust segments and to shift responsive to application of thrust loads to maintain such precise alignment.

A rotor or thrust runner, which is also typically known as a thrust collar, depending upon the characteristics of applicational thrust loads, i.e., whether the thrust loads are vertically or horizontally applied, may be physically connected to the rotatable shaft 12. As illustrated in FIG. 1, the thrust runner or collar 44 may be non-rotatably connected to the rotatable shaft 12 by means of one more keys 46 that are received within a keyway defined by matching keyway grooves 48 and 50 defined in the runner and shaft, respectively. A thrust load applying face 52 of generally planar annular configuration may be formed on the runner or collar 44 and may be disposed to apply thrust loads directly to the thrust face 22 of the various thrust pad segments of the thrust bearing structure.

It will be desirable to provide for maintenance of a thin film of lubricant material, commonly referred to as a hydrodynamic oil film, between the thrust face 22 of the various thrust pads 20 and the thrust load applying surface 52 of the rotary runner or collar 44. The hydrodynamic oil film maintains the thrust face 22 of the various thrust pad elements 20 in slightly spaced relation from the thrust applying surface 52 and thereby prevents wear that would otherwise occur to these surfaces by the relatively rotating surfaces defining these elements.

In the past, as explained above, it has been practical to provide an oil plenum within which the collar or runner must travel during each rotation, thereby allowing oil to be applied continuously to the rotating element that will flow between the thrust applying and receiving surfaces, thereby maintaining the relatively rotatable elements in spaced relation. As long as the speed of revolution is low, and thrust loads are not excessive, oil flood or plenum application of lubricant for the purpose of maintianing a hydrodynamic oil film between relatively movable surfaces is quite satisfactory.

When speeds of rotation are quite rapid and when thrust loads are severe, the oil bath method of maintaining a hydrodynamic film of lubricant between the relatively movable thrust applying and receiving surfaces will not be satisfactory. Rapid speed of shaft rotation will cause centrifugal force to act upon the hydrodynamic film of lubricant, thereby causing the film to be urged outwardly under the influence of this force. A rapidly rotating thrust applying element will not allow radially inward flow of oil to such extent that an adequate hydrodynamic oil film will be maintained between the relatively movable thrust surfaces. It is desirable, therefore, to provide a lubricant application system that effectively insures application of oil to the thrust pad segments and to the thrust applying surface of the rotary runner or collar in such manner that a- effective hydrodynamic oil film is maintained at all times to prevent excessive wear of the thrust surfaces.

When thrust loads are quite high, it is desirable to provide a flowing condition of the hydrodynamic oil film that serves an effective heat transporting function. High thrust loads and high speed rotation will cause the hydrodynamic oil film between the thrust surfaces to be heated and, to prevent excessive wear, it is desirable to remove the heated oil film. A flowing condition in the oil film will serve as an effective heat transporting agent, thereby preventing oil between the thrust surfaces from becoming overheated.

Figure 2:
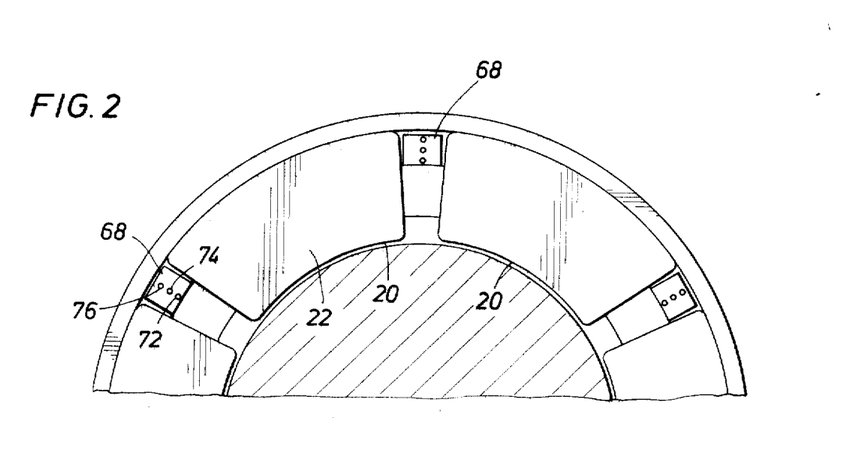
FIG. 2 is a fragmentary view taken along line 2—2 of FIG. 1 and depicting the position of the thrust pads and lubricant jet orifices of the bearing structure set forth in FIG. 1.

In accordance with the present invention, a thrust bearing lubrication system having the effect of maintaining an adequate hydrodynamic oil film between the thrust surfaces and for providing a flowing or moving oil film responsive to application of centrifugal force, may conveniently take the form illustrated in the various drawings of the present application. As shown in FIGS. 1 and 2, a lubricant supply channel or passage 54 may be formed in the bearing retainer housing structure 14 and may, in addition to supplying lubricant to a lubricant pocket 56 through a lubricant opening 58 defined in a bearing receiving sleeve 60, the passage 54 may also communicate with one or more transverse passages 62 that transport lubricant to a lubricant supply manifold chamber 64 defined by the cooperative relationship of an annular lubricant groove 66 with a planar wall defined by the recess 16.

A plurality of lubricant supply projections 66 may be defined integrally with the rigid annular retaining ring structure 18 and may be disposed between the thrust pad segments 20 in the manner shown especially in FIG. 2. Passages 70 may be defined in each of the lubricant supply projections 68 and may be disposed in communication with the lubricant supply manifold chamber 64 in such manner that lubricant will flow from the manifold chamber into the various lubricant supply passages 70.

At the outer extremity of each of the lubricant supply projections 66 a plurality of directionally oriented lubricant jet passages 72, 74 and 76 may be defined that may communicate with the lubricant supply passage 17 and terminate in outlet orifices that direct jets of lubricant toward the thrust applying surface 52 of the runner or collar 44. As is shown in FIG. 1, the jet passages 72, 74 and 76 are oriented in annular relationship one with the other in such manner that the jet passage 72 directs a jet of lubricant toward the inner periphery of the thrust applying surface 52, while the remaining jet passages are otherwise oriented. Jet passage 74 as shown in FIG. 1 is oriented in such manner as to direct a jet of lubricant toward the annular thrust applying surface 52 in such manner that the jet of lubricant will be applied intermediate the inner and outer peripheries of the annular surface 52. Lubricant jet passage 76 however is oriented in such manner as to direct a jet of lubricant in substantially normal relation with the annular surface 52, thereby causing the lubricant from jet orifice 76 to be applied to the outer peripheral portion of the annular surface 52.

The combined effects of applying jets of lubricant to the inner, intermediate and outer peripheries of the annular thrust applying surface 52 effectively achieves even distribution of lubricant to the thrust applying surface and promotes maintenance of a hydrodynamic film of lubricant between the opposed surfaces 52 and 22 even though the centrifugal force acting upon the lubricant film might otherwise be of sufficient magnitude to cause a rapid radially outward flow of the hydrodynamic oil film due to the effect of centrifugal force. As the rotatable shaft 12 is rotating and thrust loads are applied through the collar or runner 44 to the thrust face 22 of the various thrust pad segments, the directionally oriented jets of lubricant being emitted from the orifices defined by passages 72, 74 and 76 of the various lubricant supply projections 68 will result in an even distribution of lubricant about the rotating thrust applying surface 52. The film of lubricant between the surface 52 and the surfaces 22 of the thrust pads will be effectively maintained at an optimum thickness, thereby effectively preventing either peripheral portion of the thrust applying surface or thrust face surface to become overheated or worn.

The jets of lubricant that have a radially inward component of direction serve to direct lubricant flow against the direction that is induced to the hydrodynamic oil film by the effect of centrifugal force. The inwardly directed jet of lubricant provide an effective and efficient supply of lubricant fluid at the inner and intermediate portions of the annular surface 52, thereby effectively preventing the radially inward portion of the surface 52 from being starved of a sufficient hydrodynamic film of lubricant. Moreover, there is no oil flood drag or oil pumping action that causes decreased efficiency of the power source. The present bearing lubrication system accomplishes increase in efficiency and increase in load capacity of self-leveling thrust bearing structures of any given size.

Although hydrodynamic oil film starvation may be effectively retarded or prevented by directionally oriented jets of lubricant, it may also be found desirable to provide jets of lubricant that are directed in normal relation to the thrust applying surface but which jets are radially spaced relative to the thrust applying surface in such manner as to achieve even distribution of lubricant. Moreover, it may be desirable to vary the physical dimension of the jets of lubricant in such manner that an optimum hydrodynamic film of lubricant may be maintained between the thrust applying and thrust receiving surfaces by effective distribution of the lubricant fluid.

Figure 3:
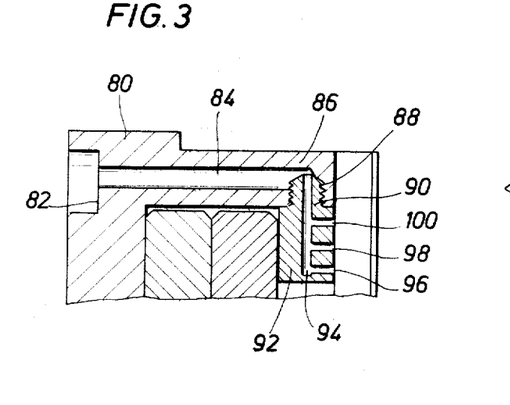
FIG. 3 is a fragmentary sectional view of a thrust bearing structure similar to that depicted in FIGS. 1 and 2 and having a lubrication system defining a modified embodiment of the present invention.

As shown in FIG. 3, representing a modified embodiment of the present invention, a bearing retainer ring structure 80 similar to that shown at 18 in FIG. 1, may be provided for retention within an annular bearing retainer groove such as that set forth at 16 in FIG. 1. The retainer ring structure 80 may be formed to define an annular groove 82 that cooperates with a planar surface such as that shown at 16 in FIG. 1, to define a lubricant supply manifold chamber to which may be communicated a plurality of lubricant supply passages 84 defined in a plurality of lubricant supply projections 86 that may be formed integrally with the retainer ring structure. Threaded apertures 88 may be formed in the lubricant distribution projections 86 and may communicate with the respective passages 84 and a threaded portion 90 of a lubricant distribution head 92 may be received within the threaded opening 88. A major lubricant supply passage 94 may be defined in the head structure 92 and may be communicated with the lubricant supply passage 84. A plurality of transverse lubricant jet passages 96, 98 and 100 may be defined in the head structure 92 in intersecting relationship with the major lubricant supply passage 94 and may conduct jets of lubricant from the passage 94, which jets may be directed in substantially normal relationship to the opposed thrust force applying surface of the rotating runner or collar. Transverse jet passage 96 may be disposed to direct a jet of lubricant at or adjacent the inner peripheral portion of the thrust applying surface, while the remaining transverse passages 98 and 100 may be oriented in such manner as to direct jets of lubricant toward the intermediate and outer peripheral portions of the thrust applying surface. Even though the rotating runner or collar may be rotating quite rapidly, thereby causing centrifigual force acting upon the hydrodynamic oil film to be of sufficient degree to cause rapid outward flow of the oil film, sufficient evenly distributed supply of lubricant will be continuously applied to the rotating thrust applying surface to maintain an adequate film of lubricant between the thrust applying and thrust receiving surfaces.

Figure 4:
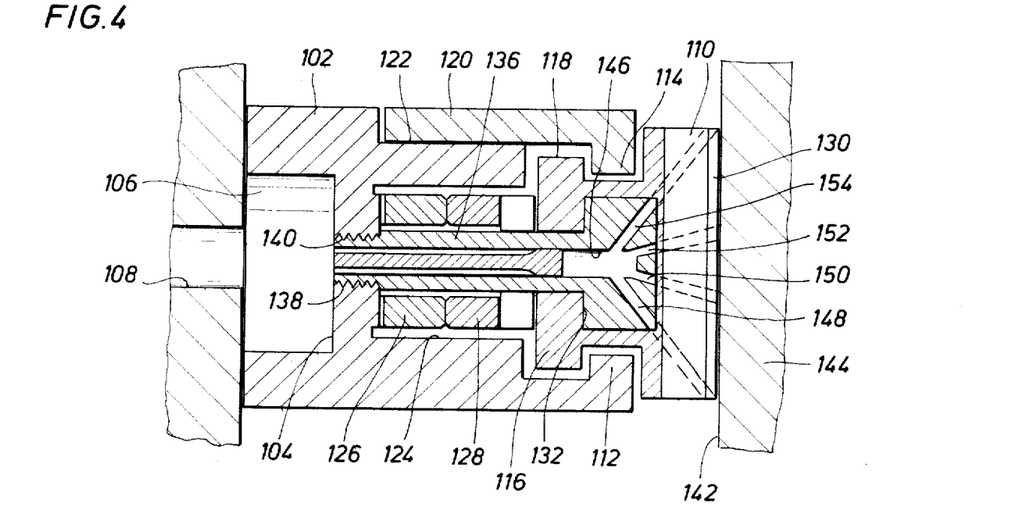
FIG. 4 is a partial sectional view of a self-leveling thrust bearing construction having a bearing lubrication system and defining a further modified embodiment of the present invention.

Referring now to FIG. 4, where a further modified embodiment of the present invention is illustrated, a lubricated self-leveling thrust bearing construction is depicted, representing a further modified embodiment of the present invention. A generally rigid retainer ring implement 102 may be provided having an annular groove 104 formed therein and cooperating with an annular planar surface defined by a thrust bearing recess, such as that depicted at 16 in FIG. 1, to define an annular manifold chamber 106, to which is supplied lubricant via a passage 108 that is communicated with a convenient source of lubricant supply.

A plurality of thrust pad segments 110 are provided that are received within an annular thrust pad retainer groove that is defined in part by cooperating flanges 112 and 114 that provide stop surfaces for flanges 116 and 118 defined on each of the thrust pads 110. Flange 114 is defined on an annular retainer ring 120 that may be press fitted about an annular reduced diameter surface 122 of the rigid ring body 102 or may be received in fixed relation with the ring structure 102 in any other desirable manner.

An annular groove 124 defined in the ring body 102 is adapted to receive a plurality of leveling links 126 and 128 that engage the inner portion of the thrust pads 110 in such manner as to allow the thrust pads to have sufficient universal movement that allows a thrust receiving face 130, formed on the thrust pads, to seek optimum bearing engagement with the planar thrust applying surface of the rotatable thrust runner or collar.

Each of the thrust pad segments 110 may be formed to define a pair thrust pad retention shoulders 132 which may be disposed for engagement by the head portion 134 of a bolt 136 that serves to retain the thrust pad segment in proper movably related assembly with the remaining portions of the thrust bearing construction. One extremity of the bolt 136 may be provided with an externally threaded portion 138 that is received by an internally threaded bore 140 formed in the rigid ring body structure 102 in such manner as to expose the threaded extremity of the bolt 136 to lubricant contained within the annular manifold chamber 106.

To maintain a hydrodynamic film of lubricant between the thrust applying surface 142 of a rotatable collar or runner 144, a lubricant supply passage 146 may be formed in the bolt 136 and may be communicated with a plurality of annularly oriented lubricant jet passages 148, 150, 152 and 154 that direct jets of lubricant toward the annular thrust applying surface in the space between the thrust pads 110, as shown in broken line. The lubricant jet passages 148 through 154 may be wider toward the outer extremity thereof, as illustrated in FIG. 4, in such manner that the jets of lubricant have a widening or spreading characteristic as the space between the head portion 134 of the bolt and the thrust applying surface 142 is transitioned. The pressure of lubricant within the lubricant supply passage 146 of each of the bolts will be sufficient to cause the lubricant emerging from the respective lubricant jet passages to transition the space between the head 134 and of the surface 132 and to impinge upon the surface 142 with sufficient velocity to cause the lubricating oil to be distributed onto the thrust applying surface of the runner or collar.

Figure 5:
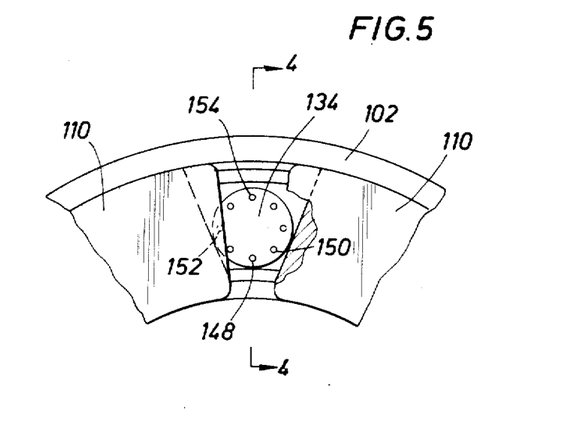
FIG. 5 is a partial elevational view of the bearing structure set forth in FIG. 4 exclusive of the thrust runner portion of the bearing structure and depicting the thrust pads and lubricant distribution heads in position relative to the bearing retainer structure.

The relationship of the bolt head 134, the thrust pads 110, the retainer ring body structure 102 and the various lubricant jet passages is more clearly apparent when reference is made to FIGS. 4 and 5. It should be noted that the lubricant jet passages of the head portion 134 of the bolt structure may be oriented in such manner as to direct jet streams of lubricant in many different directions, thereby causing the lubricant to be evenly distributed on the entirety of the thrust applying surface 142.

Figure 6:
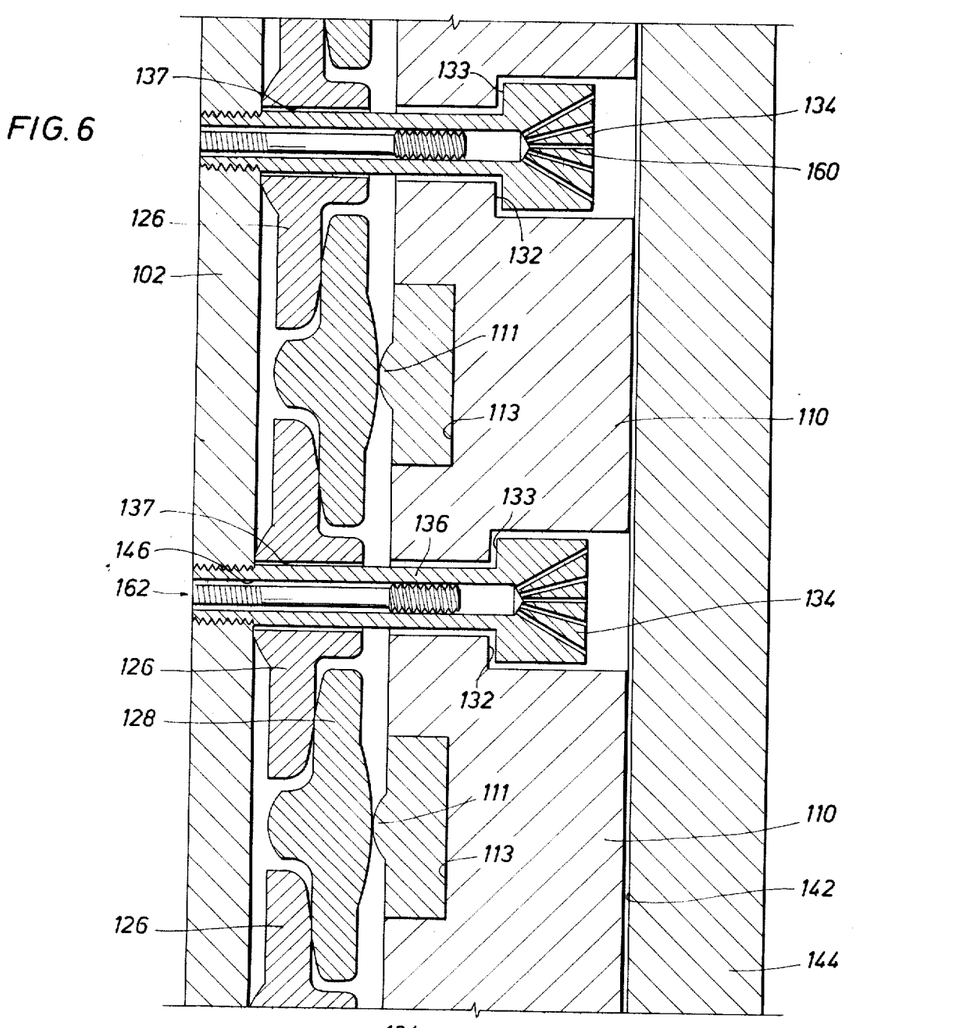
FIG. 6 is a sectional view of a thrust bearing structure representing a modified embodiment of the persent invention and illustrating the lubricating system of the bearing structure in detail.
Figure 7:
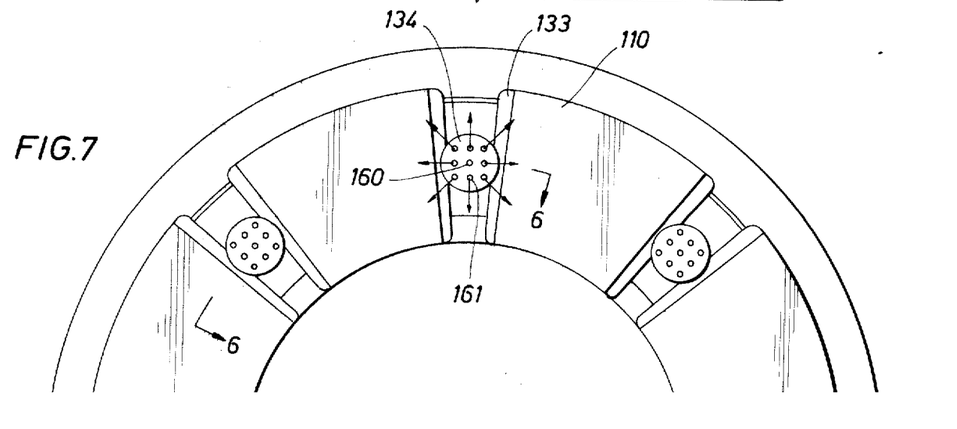
FIG. 7 is an elevational view of a portion of the thrust bearing structure set forth in FIG. 6 exclusive of the thrust runner portion of the bearing mechanism and depicting the relation between the retainer body, the thrust pads and the bearing lubrication heads.

Referring now to FIGS. 6 and 7, there is depicted a self-leveling lubricant jet lubricated self-leveling thrust bearing structure that differs from the structures set forth in FIGS. 4 and 5 only in the provision of a lubricant supply system that incorporates lubricant jets that are differently oriented as compared to the lubricant jet passage structure set forth in FIGS. 4 and 5 and cause more even distribution of lubricant on the thrust applying surface of a thrust runner or collar. The section of FIG. 6, taken along line 6—6 in FIG. 7, illustrates the relationship of the leveling links to the thrust pad structure and to the bolt structure in more detail. It should be noted that the shoulders 132, defined on a thrust pads 110 are adapted to engage stop surfaces 133 defined on the bolt heads 134 to limit movement of the thrust pads in one direction. The leveling links 126 are retained in position relative to the ring body portion 102 of the bearing structure by the bolts 136 which extend through appropriate apertures 137 formed in the leveling link structure. The leveling links 128 are retained in proper position relative to the remaining portion of the thrust bearing structure by engagement with the leveling links 126 and by engagement with a projecting portion 111 of a hardened thrust pad insert 113.

The head portion 134 of each of the bolts, as shown particularly in FIGS. 6 and 7, are provided with a large number of jet passages that may be variously oriented in annular relation to achieve optimum lubricant distribution. As shown in FIGS. 6 and 7, the centermost passage 160 of the various lubricant jet passages may be oriented to direct a jet of lubricant in substantially normal relation to the planar thrust applying surface 142 of the runner or collar 144. The remaining lubricant jet passages will be variously oriented in angular relationship to one another so as to direct jets of lubricant to other specific areas of the exposed thrust force applying surface 142. For example, each of the jet passages may direct a jet of lubricant in the manner shown by the jet flow arrows, thereby causing lubricant to be evenly distributed over a large exposed area of the thrust applying surface. The bolt head and jet passage structure, illustrated in FIGS. 6 and 7, may be effectively utilized when the thrust bearing structure is quite large. A number of the lubricant jet passages of the head structure 134 will be directed inwardly, causing the jets of lubricant to have a component of direction that opposes the direction induced by centrifugal force to the film of oil between the thrust applying and thrust load receiving surfaces.

It may be desirable to provide the thrust bearing lubrication system with filtering means that effectively achieves a filtering function separating any foreign matter from the flowing lubricant that would otherwise cause the lubricant jet passages to become clogged and prevent effective maintenance of a hydrodynamic film of oil between the thrust applying and thrust receiving surfaces. In accordance with the present invention, and as illustrated in FIGS. 4, 6 and 8, a filter element, illustrated generally at 162, may be received within the passage 146 of the bolt 136 in order to provide an efficient filtering function that prevents foreign matter from reaching the various lubricant jet orifices of the bolt head structure.

Figure 8:
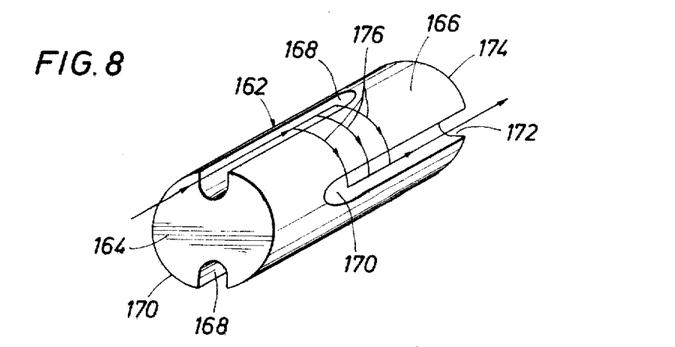
FIG. 8 is an isometric view of a threaded filter element having flow paths depicted thereon showing the path of lubricant flow through the filter assembly toward the directionally oriented lubricant jet passages of the bearing lubrication system.

As shown in FIG. 8, the filter element 162 may be an elongated rod-like element 164 that may be composed of metal or any other suitable material, which rod may be provided with a conventionally threaded external surface 166. A plurality of lined grooves 168 and 170 may be formed in the rod structure 164, each of the grooves extending to one extremity of the rod structure, but terminating short of the opposite extremity. For example, blind grooves 168 will communicate with the upstream extremity 170 of the rod structure 164, thereby cooperating with the bore 146 of the bolt 136 to define a blind oil inlet passage. Likewise, blind grooves 172, formed in the rod structure, communicate with the downstream extremity 174 of the rod structure, but terminate short of the upstream extremity.

The threads or grooves 166 formed on the outer periphery of the rod structure 164 will cooperate with the cylindrical wall structure defined by the passage or bore 146 in the bolt 136 in such a manner as to define a plurality of small transverse oil flow passages, such as shown at 176 that establish communication between the upstream and downstream blind grooves.

Lubricating oil will therefore flow into the chamber defined by the cooperative relationship of the blind passage 168 with the cylindrical wall structure of the bore 146 and will flow through the plurality of small filter passages, defined by the threads or grooves, into the downstream blind recess. The lubricant exiting from the downstream recess 170 will then flow to the various lubricant jet passages free of any foreign matter that may be transported with the oil to the filter assembly. The cross-sectional dimension of each of the small filter passages 176 extending between the blind grooves 168 and 172 will be of smaller cross sectional dimension than the dimension of the jet passages, thereby allowing any foreign matter that passes through the small filter passages to pass more readily through the lubricant jet passages. There will be no tendency whatever for the jet passages to become clogged to the extent that any particular area of the thrust applying and thrust load receiving surfaces is starved of an adequate film of lubricant.

In view of the foregoing it is apparent that I have provided a novel lubricated self-leveling thrust bearing structure that provides efficient lubrication to maintain an optimum hydrodynamic film of lubricant between thrust load applying and receiving surfaces that are relatively movable without in any way interfering with the operation of the various thrust pad segments of the bearing structure. Moreover, the lubrication system incorporated into self-leveling thrust bearing structure provides an effectively controlled supply of lubricant that serves to evenly distribute lubricant on the thrust applying surface of the runner or collar that rotates relative to the thrust bearing structure without incurring the parasitic pumping power losses inherent in conventional flood lubricated bearings. Further, the temperature of the lubricant entering the load bearing process is reduced, thereby increasing specific load capacity of the bearing structure.

To counteract any tendency of the hydrodynamic film of lubricant, between the thrust applying and thrust receiving surfaces, to become exhausted to the point that wear or hot spots may develop that would otherwise cause accelerated deterioration of the thrust applying and thrust receiving surfaces and cause the bearing to become overheated, jets of lubricant will be directed to appropriate portions of the thrust applying surface of the rotary runner or collar. At least some of the jets of lubricant will have a component of direction that opposes the direction induced to the film of lubricant by centrifugal force. As the lubricant film moves radially outwardly under inducement of centrifugal force, inwardly directed jets of lubricant will create an optimum supply of lubricant that is properly applied to the bearing structure in order to cause the hydrodynamic film of lubricant to be effectively maintained at all times even though the speed of shaft rotation may be quite rapid.

The invention is disclosed herein in relation to certain specific embodiments of a lubricated self-leveling thrust bearing structure of specific nature, but it will be understood that this is intended by way of illustration only and that various changes may be made in the structure and arrangements of the thrust bearing structure within the spirit and scope of the present invention.

It is therefore seen that my invention is one well adapted to attain all of the objects and advantages hereinabove set forth, together with other advantages which will become obvious and inherent from a description of the apparatus itself. It will be understood that certain combinations and subcombinations are of utility and may be employed without reference to other features and subcombinations. This is contemplated by and is within the scope of the present invention.

What is claimed is:

1. A lubricated self-leveling thrust bearing construction capable of sustaining thrust loads applied thereto by a rotatable shaft, said thrust bearing construction comprising:

rotatable thrust force applying means being disposed in fixed relation to said rotary shaft;

thrust pad means being disposed in movable but nonrotatable position relative to said rotatable shaft and being disposed to receive thrust loads applied thereto by said rotatable thrust force applying means;

lubricant supply means for maintaining a hydrodynamic film of lubricant between said thrust pad means and said thrust force applying means, said lubricant supply means directing at least one jet of lubricant toward said thrust force applying means and causing said jet of lubricant to impinge upon said thrust force applying means, said jet of lubricant having a component of direction that opposes the direction of lubricant flow that is induced to said hydrodynamic film of lubricant by centrifugal force; and means communicating a quantity of pressurized lubricant to said lubricant supply means.

2. A thrust bearing construction as recited in claim 1, wherein:

said thrust pad means comprise a plurality of thrust pads each having a generally planar thrust force receiving surface formed thereon and being movable by force applied thereto by said thrust force applied thereto by said thrust force applying means;

said thrust force applying means includes a generally planar thrust force applying surface through which thrust forces are transmitted to each of said thrust pads, said thrust force applying means causing individual movement of said thrust pads to cause the planar surfaces formed thereon to seek optimum aligned relation with said planar thrust force applying surface; and said lubricant supply means including jet head means being disposed between said thrust pad means and cause said jet of lubricant to be applied to the portion of said thrust applying surface that is exposed between said thrust pad means, said lubricant supply means retaining said thrust pad means in movable oriented relation.

3. A thrust bearing construction as recited in claim 1, wherein said lubricant supply means comprises:
projection means being disposed in generally stationary relation to said thrust force applying means and said thrust pad means and being disposed between said thrust pad means;
lubricant supply passage means being formed in said projection means; and
lubricant jet passage means being formed in said projection means and being disposed in communication with said lubricant supply passage means, said lubricant jet passage means being oriented to direct said at least one jet of lubricant onto said planar thrust surface of said thrust force applying means.

4. A thrust bearing construction as recited in claim 3, wherein said lubricant jet passage means comprises:
a plurality of lubricant jet passages being formed in said projection means, at least some of said jet passages being oriented to direct jets of lubricant onto said planar surface of said thrust force applying means with a component of direction that opposes the direction induced to said hydrodynamic film of lubricant by centrifugal force.

5. A thrust bearing construction as recited in claim 3, wherein said lubricant jet passage means comprises:
a plurality of lubricant jet passages being formed in said projection means, said jet passages being angularly oriented one relative to the other, at least some of said jet passages being oriented to direct jets of lubricant onto said planar surface of said rotatable thrust applying means with differing components of direction, at least some of said jets of lubricant having components of direction that oppose the direction induced to said hydrodynamic film of lubricant by centrifugal force.

6. A thrust bearing construction as recited in claim 3, wherein said lubricant jet passage means comprises:
a plurality of lubricant jet passages being formed in said projection means, said jet passages being angularly oriented one relative to the other, at least some of said jet passages being oriented to direct jets of lubricant onto said planar surface of said rotatable thrust force applying means with differing components of direction, at least some of said jets of lubricant having components of direction that oppose the direction induced to said hydrodynamic film of lubricant by centrifugal force and at least some of said jets of lubricant having components of direction that coincide with the direction of flow induced to said hydrodynamic film of lubricant by centrifugal force.

7. A thrust bearing construction as recited in claim 3, wherein said thrust bearing construction includes:
an annular generally rigid thrust pad retainer body adapted to be received about said rotatable shaft;
means retaining said thrust pads in movable assembly with said thrust pad retainer body; and
said projection means being formed integrally with said thrust pad retainer body.

8. A thrust bearing construction as recited in claim 3, wherein said thrust bearing construction includes:
an annular generally rigid thrust pad retainer body adapted to be received about said rotatable shaft;
said projection means being bolt elements threadedly connected to said rigid thrust pad retainer body, said bolt elements each having a bolt head formed thereon with at least a portion of said bolt heads disposed for engagement with said thrust pads and retaining said thrust pads in assembly with said thrust pad retainer body; and
said lubricant jet passage means being formed in said bolt head.

9. A thrust bearing construction as recited in claim 8, wherein said lubricant jet passage means comprises:
a plurality of lubricant jet passages being formed in said heads of each of said bolts, said jet passages being angularly oriented one relative to the other, at least some of said jet passages being oriented to direct jets of lubricant onto said planar surface of said rotatable thrust applying means with differing components of direction, at least some of said jets of lubricant having components of direction that oppose the direction induced to said hydrodynamic film of lubricant by centrifugal force.

10. A thrust bearing construction as recited in claim 8, wherein said lubricant jet passage means comprises:
a plurality of lubricant jet passages being formed in said heads of each of said bolts, said jet passages being angularly oriented one relative to the other, at least some of said jet passages being oriented to direct jets of lubricant onto said planar surface of said rotatable thrust force applying means with differing components of direction, at least some of said jets of lubricant having components of direction that oppose the direction induced to said hydrodynamic film of lubricant by centrifugal force and at least some of said jets of lubricant having components of direction that coincide with the direction of flow induced to said hydrodynamic film of lubricant by centrifugal force.

11. A thrust bearing construction as recited in claim 1, including:
a filter element being disposed within said lubricant supply means, said filter element having a plurality lubricant filtering passages defined thereby that are of smaller dimension than the dimension of said lubricant jet passage means.

12. A thrust bearing construction as recited in claim 11, wherein said lubricant supply means includes a generally cylindrical passage and said filter element comprises:
a filter rod having a grooved external periphery defined thereon;
a plurality of non-registering blind grooves being formed longitudinally of said filter rod, said blind grooves being intersected by the external grooves formed in the periphery of said rod; and
said external grooves cooperating with said generally cylindrical passage to define said plurality of filtering passages, said filtering passages establishing communication between said blind grooves.

13. A lubricated, self leveling thrust bearing construction capable of sustaining thrust loads applied thereto by a rotatable shaft, said thrust bearing construction comprising:
a rotatable thrust element being disposed in fixed relation to said rotary shaft and having a generally planar annular thrust applying surface formed thereon;

a bearing retainer body of annular configuration being supported about said rotary shaft in generally fixed relation;

a plurality of thrust pads being supported by said bearing retainer body and being disposed in generally equally spaced relation about said rotatable shaft, said thrust pads being movably carried by said bearing retainer body and being movable responsive to force induced by said rotatable thrust element to seek optimum bearing engagement with said planar thrust applying surface;

leveling linkage means being disposed between said bearing retainer body and said thrust pads and functioning, responsive to force applied thereto by said thrust pads, to allow movement of said thrust pads relative to said retainer body and to transmit thrust loads from said thrust pads to said bearing retainer body;

lubricant supply means for maintaining a hydrodynamic film of lubricant between said thrust pads and said thrust element, said lubricant supply means having lubricant jet passage means directing at least one jet of lubricant against said planar thrust applying surface, said jet of lubricant having a component of direction that opposes the direction of lubricant flow that is induced to said hydrodynamic film of lubricant by centrifugal force said lubricant supply means retaining said thrust pads and said leveling linkage in assembly with said bearing retainer body;

means communicating a quantity of pressurized lubricant to said lubricant supply means.

14. A thrust bearing construction as recited in claim 13, wherein said lubricant supply means comprises:

projection means being disposed in generally stationary relation to said thrust force applying means an said thrust pad means and being disposed between said thrust pad means;

lubricant supply passage means being formed in said projection means; and lubricant jet passage means being formed in said projection means and being disposed in communication with said lubricant supply passage means, said lubricant jet passage means being oriented to direct a jet of lubricant onto said planar thrust applying surface.

15. A thrust bearing construction as recited in claim 14, wherein said lubricant jet passage means comprises:

a plurality of lubricant jet passages being formed in said projection means, at least some of said jet passages being oriented to direct jets of lubricant onto said planar surface of said thrust applying surface with a component of direction that opposes the direction induced to said hydrodynamic film of lubricant by centrifugal force.

16. A thrust bearing construction as recited in claim 14, wherein said lubricant jet passage means comprises:

a plurality of lubricant jet passages being formed in said projection means, said jet passages being angularly oriented one relative to the other, at least some of said jet passages being oriented to direct jets of lubricant onto said planar surface of said rotatable thrust applying means with differing components of direction, at least some of said jets of lubricant having components of direction that oppose the direction induced to said hydrodynamic film of lubricant by centrifugal force.

17. A thrust bearing construction as recited in claim 13, wherein said lubricant jet passage means comprises:

a plurality of lubricant jet passages being formed in said projection means, said jet passages being angularly oriented one relative to the other, at least some of said jet passages being oriented to direct jets of lubricant onto said planar surface of said rotatable thrust force applying means with differing components of direction, at least some of said jets of lubricant having components of direction that oppose the direction induced to said hydrodynamic film of lubricant by centrifugal force and at least some of said jets of lubricant having components of direction that coincide with the direction of flow induced to said hydrodynamic film of lubricant by centrifugal force.

18. A thrust bearing construction as recited in claim 13, including:

a filter element being disposed within said lubricant supply means, said filter element having a plurality lubricant filtering passages defined thereby that are of smaller dimension than the dimension of said lubricant jet passage means.

19. A thrust bearing construction as recited in claim 18, wherein said lubricant supply means includes a generally cylindrical passage and said filter element comprises:

a filter rod having a grooved external periphery defined thereon;

a plurality of non-registering blind grooves being formed longitudinally of said filter rod, said blind grooves being intersected by the external grooves formed in the periphery of said rod; and said external grooves cooperating with said generally cylindrical passage to define said plurality of filtering passages, said filtering passages establishing communication between said blind grooves.

20. A thrust bearing construction as recited in claim 13, wherein said lubricant supply means includes:

elongated retainer means having lubricant supply passage means formed therein, said retainer means having a jet head formed thereon and having lubricant jet passages formed therein in communication with said lubricant supply passage means; and retention means being formed on said thrust pad means and said leveling linkage and being engaged with said elongated retainer means to retain said thrust pads and sail leveling linkage in movable assembly with said bearing retainer body.

* * * * *